T. B. JEFFERY.
AUTOMOBILE.
APPLICATION FILED AUG. 25, 1902.
899,537.
Patented Sept. 29, 1908.
2 SHEETS—SHEET 1.
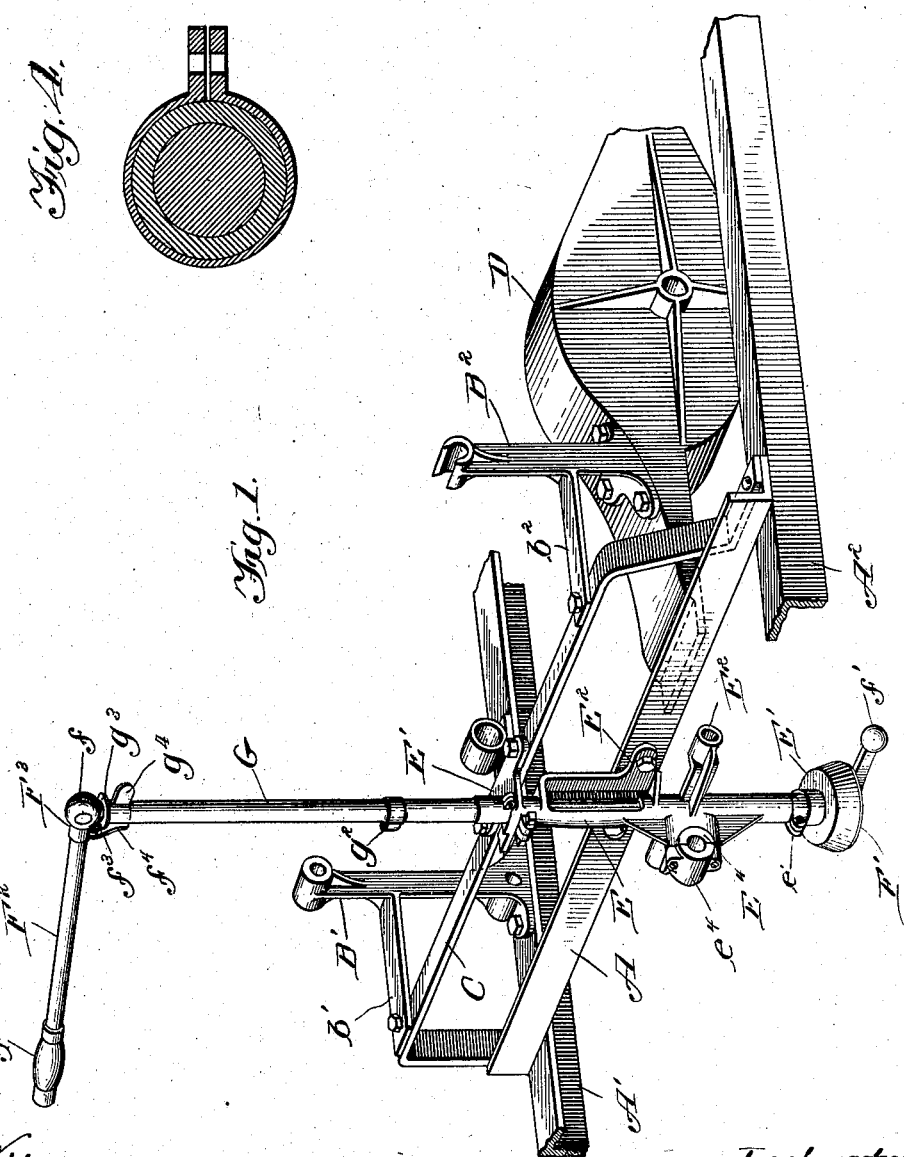
Witnesses:
H. S. Gaither.
Elizabeth Q. Busby
Inventor:
Thomas B. Jeffery
by Chamberlin & Wilkinson
his Attorneys.

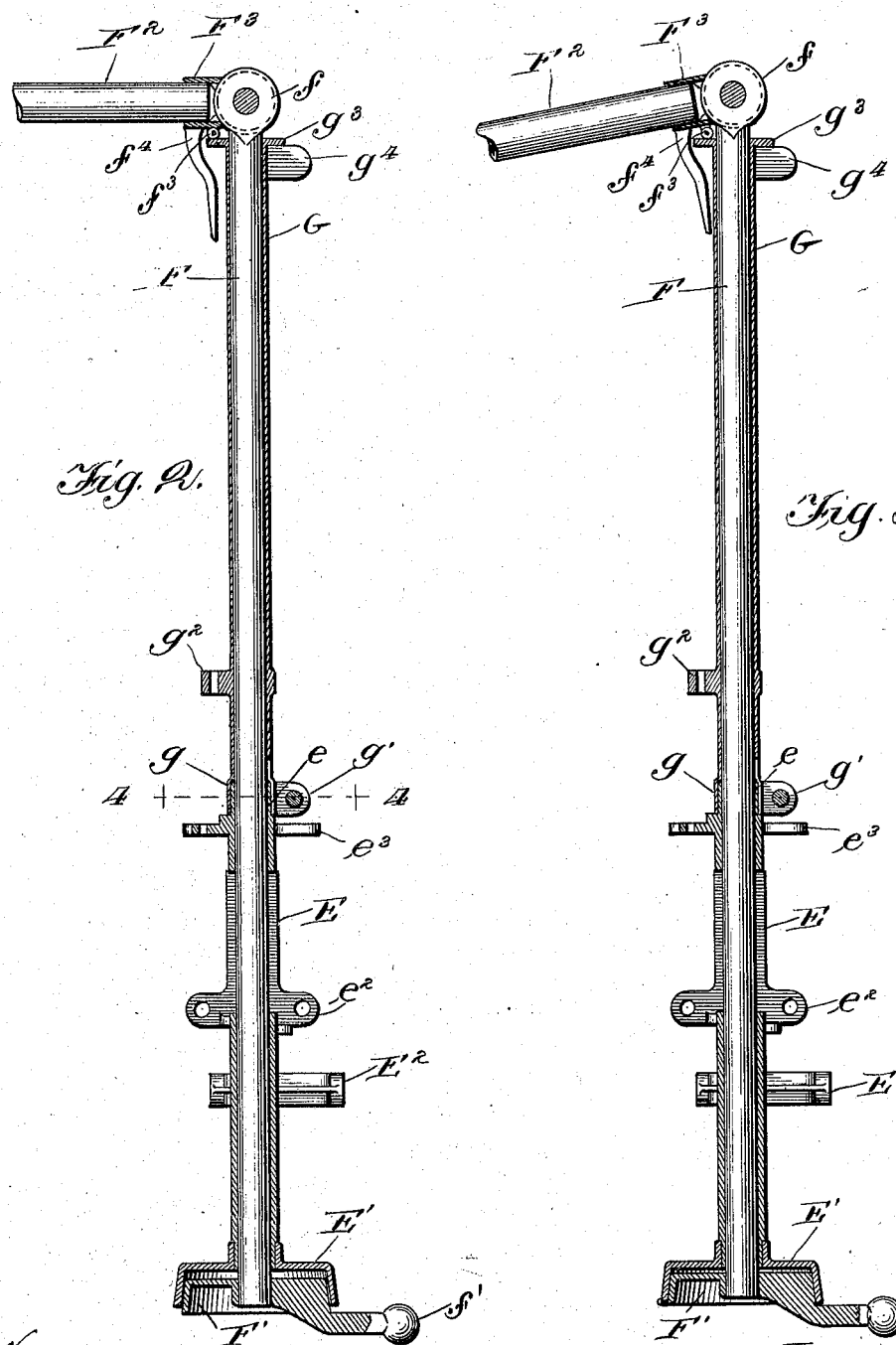

UNITED STATES PATENT OFFICE.

THOMAS B. JEFFERY, OF KENOSHA, WISCONSIN.

AUTOMOBILE.

No. 899,537.    Specification of Letters Patent.    Patented Sept. 29, 1908.

Application filed August 25, 1902. Serial No. 120,924.

*To all whom it may concern:*

Be it known that I, THOMAS B. JEFFERY, citizen of the United States, residing at Kenosha, county of Kenosha, State of Wisconsin, have invented a certain new and useful Improvement in Automobiles; and I declare the following to be a full, clear, and exact description of the same, such as will enable others skilled in the art to which it pertains to make and use the same, reference being had to the accompanying drawings, which form a part of this specification.

My invention relates in general to improvements in automobiles, and more particularly to means for operating the steering mechanism and the motive fluid controller.

In the use of automobiles occasions sometimes arise when it is advantageous to lock the steering mechanism so as to retain the steering wheels in a certain position. It is also desirable that the steering rod of an automobile should be supported by the frame which carries the engine so that the body of the vehicle may be removed without necessitating the detachment of the steering rod support. It is further desirable that the means for operating the motive fluid controller should be conveniently located with respect to the steering rod.

The primary objects of my invention are to provide an automobile with steering mechanism which may be readily locked in any given position and readily unlocked when it is desired to change the position of the steering wheels, or if not locked to provide sufficient friction so that in traveling if one wheel strikes an obstruction the shock on the steering lever will be relieved, and to provide a secure support for the steering rod independent of the body of the vehicle. A further object of my invention is to provide a controller for the motive fluid which may be mounted upon the same support as and surround the steering rod.

My invention will be more fully described hereinafter with reference to the accompanying drawings in which the same is illustrated as embodied in a convenient and practical form, and in which—

Figure 1 is a perspective view of my improvements and so much of the engine supporting frame on an automobile as is necessary to show the connection therewith of my improvements; Fig. 2 is an enlarged sectional view of my improvements detached from the supporting frame of the automobile; Fig. 3 a view similar to Fig. 2 showing the steering rod in its locked position; and Fig. 4 an enlarged sectional view on line 4—4, Fig. 2.

Similar reference characters are used in the several figures of the drawings to indicate similar parts.

The embodiment of my invention herein disclosed consists, generally described, in a socket secured at a plurality of points, preferably one above another, to the engine supporting frame of an automobile, a steering rod extending through and rotatably supported in the socket, a sleeve operatively connected with the motive fluid controller surrounding the steering rod and supported upon the socket, and a friction clutch interposed between the socket and steering rod and operated by a vertical movement of the latter to lock and unlock the steering mechanism.

Reference characters A' and A² indicate side portions of the engine supporting frame, which are preferably formed of angle metal. A indicates a cross beam secured at its ends to the upper surfaces of the side beams A' and A².

B' indicates a standard secured at its base to the beam A' and provided with an arm b' secured to a brace C, the opposite ends of the latter being secured to the side portions of the engine supporting frame and preferably by means of the same fastening devices which secure the cross beam A to the side beams. A second standard B² is supported at its base upon the casing D, the latter being in engagement at one end of the cross beam A. An arm b² is provided on the standard B² to secure the latter rigidly to the brace C. The standards B' and B² are provided with bearings in which is journaled the shaft for starting the engine.

A socket E for supporting the steering rod F is rigidly secured to the frame for supporting the engine at a plurality of points, preferably one above the other. In the drawings the socket E is provided with a pair of perforated lugs e² which are fixed to the vertical surface of the cross beam A by any suitable securing means, such for instance as bolts. A second pair of perforated lugs e³ extend horizontally above the upper surface of the brace C to which they are rigidly secured by any suitable means, as for instance bolts. Rigidly secured to the lower end of the socket E is one member E' of a friction clutch which may conveniently be formed cup-shape, as illustrated in the drawings.

A sleeve G extends above the socket E and is rotatably mounted on a reduced portion $e$ at the upper end of the socket. The portion $g$ at the lower end of the sleeve G is preferably slightly enlarged in diameter to surround the reduced portion $e$ of the socket. The enlarged portion $g$ is split and provided with a pair of lugs $g'$ through which a clamp screw is passed to adjust the frictional engagement between the socket and sleeve. The sleeve G is provided with suitable means, such for instance as the perforated lug $g^2$ for operatively connecting the same with the motive fluid controller. The upper end of the sleeve is provided with a radial flange $g^3$ and also with a projection $g^4$, the function of the latter being to afford a convenient means for rotating the sleeve G and thereby operating the controller.

The steering rod F extends through the socket E and sleeve G within which it is rotatably mounted. The lower end of the steering rod is provided with the other member F' of the two-part friction clutch above referred to. An arm $f'$ is rigidly secured to the lower end of the steering rod which is adapted to engage connections leading to the steering wheels. The member F' of the clutch may be rigidly secured to the steering rod by any suitable means and is of such a shape that its exterior surface corresponds to the interior surface of the other member E' of the clutch. The member E' of the clutch is rigidly secured to the lower end of the socket E by any suitable means, as for instance by the split collar $e'$ through perforated lugs in which a clamp screw passes, or if desired the parts may be made in one piece. The upper end $f$ of the steering rod is perforated to which is hinged the end of the steering lever F². The lever F² is provided with a handle $f^2$ to be grasped by the hand of the operator to rotate the steering rod. The end of the steering lever F² adjacent to its connection with the steering rod is provided with a depending fulcrum $f^3$ which may be conveniently provided with a friction roller. The fulcrum $f^3$ is located vertically above the radial flange $g^3$ at the top of the sleeve G. A short hand lever $f^4$ depends from the end of the steering lever F² adjacent to the fulcrum $f^3$. The fulcrum $f^3$ and the hand lever $f^4$ may conveniently be secured to a coupling F³ interposed between the end of the steering lever F² and the upper end $f$ of the steering rod, or the parts may be in one piece.

The socket E is shown as provided with laterally projecting perforated bosses E² and also on the other side thereof with a horizontal bearing E⁴ to which is secured a complemental bearing $e^4$. The bosses and bearing form convenient means of supporting portions of the operating mechanism which however form no part of my present invention and are consequently not herein described in detail.

The operation of my invention which will be readily understood from the foregoing description is as follows; The steering rod is oscillated to direct the course of the automobile by means of the lever F², as is customary in such vehicles. The socket being secured to the frame of the engine at a plurality of points one above another, securely maintains the steering rod in the desired position and prevents the same from moving laterally in any direction. The oscillation of the steering rod by means of the steering lever swings the arm $f'$ at the lower end of the rod and through the connections engaged thereto adjusts the positions of the steering wheels. When it is desired to lock or frictionally retain the steering wheels in a given position, the steering rod is elevated from the position shown in Fig. 2 to that shown in Fig. 3, thereby bringing into engagement the two parts of the friction clutch. The steering rod may be elevated either by depressing the steering lever F² which through the engagement of the fulcrum $f^3$ with the radial flange $g^3$ forcibly lifts the steering rod upwardly. The elevation of the steering rod may also be effected by grasping the hand lever $f^4$ and pressing the same towards the sleeve G, thereby oscillating the steering lever F² about its fulcrum $f^3$ and consequently lifting the steering rod, or the steering rod may be elevated by other convenient means. The two members of the friction clutch may be readily disengaged when it is desired to unlock the steering mechanism by elevating the steering lever F² to its normal position, indicated in Fig. 2. The sleeve G may be rotated about the reduced end of the socket by applying pressure to the projection, thereby operating the motive fluid controller.

From the foregoing description it is obvious that I have invented an improved means for rigidly supporting the steering rod independently of the body of the vehicle, such means being also adapted to support the sleeve for operating the motive fluid controller. It is also obvious that I have invented an improved steering mechanism for automobiles capable of being readily locked to retain the steering wheels in any desired position and as readily unlocked when it is desired to again adjust the steering mechanism.

While I have described more or less precisely the details of construction I do not wish to be understood as limiting myself thereto, as I contemplate changes in form, the proportion of parts, and the substitution of equivalents, as circumstances may suggest or render expedient, without departing from the spirit of my invention.

Having now fully described my invention what I claim as new and desire to secure by Letters Patent is—

1. In an automobile, the combination with the frame for supporting the engine comprising side beams, a cross beam supported at its ends by the side beams and a brace extending above the cross beam and also supported at its ends by the side beams, a socket secured to the cross beam and brace of said frame, a steering rod supported within said socket whereby the body of the vehicle may be removed without detaching the steering rod support.

2. In an automobile, the combination with the engine supporting frame comprising side beams, a cross beam supported at its ends by the side beams and a brace extending above the cross beam and also supported at its ends by the side beams, of a vertical socket for the steering rod secured at its lower end to said cross beam and at its upper end to said brace whereby the socket and steering rod are braced against lateral movement.

3. In an automobile, the combination with a steering rod, of a relatively fixed socket in which said rod is rotatably and longitudinally movably supported, a two-part friction clutch the members of which are secured respectively to said socket and rod, a steering lever pivotally secured to said rod, and a fulcrum for said lever whereby pressure applied to said lever moves said rod longitudinally within said socket thereby forcing the members of said clutch into frictional engagement.

4. In an automobile, the combination with a steering rod, of a relatively fixed socket in which said rod is rotatably and longitudinally movably supported, a two-part friction clutch the members of which are secured respectively to said socket and rod, a steering lever pivotally secured to said rod, and a fulcrum for said lever, and a hand lever fixed to and depending from the said steering lever whereby when pressure is applied to said hand lever said rod is longitudinally moved within said socket thereby forcing the members of said clutch into frictional engagement.

5. In an automobile, the combination with the engine supporting frame, of a socket rigidly secured to said frame, a steering rod supported within said socket, and a sleeve for operating the motive fluid controller surrounding said rod and supported upon said socket.

6. In an automobile, the combination with the engine supporting frame, of a socket rigidly secured to said frame at a plurality of points, a steering rod supported within said socket, a sleeve for operating the motive fluid controller surrounding said rod and supported upon said socket, and means for producing a frictional engagement between said sleeve and said socket.

7. In an automobile, the combination with a steering rod, of a relatively fixed socket in which said rod is rotatably and longitudinally movably supported, a two-part friction clutch the members of which are secured respectively to said socket and rod, a steering lever pivotally secured to said rod, a sleeve for operating the motive fluid controller surrounding said rod and supported upon said socket, a flange radially projecting from said sleeve adjacent to said lever whereby when the lever is depressed it engages said flange thereby lifting said rod and forcing the members of said clutch into frictional contact.

In testimony whereof, I sign this specification in the presence of two witnesses.

THOMAS B. JEFFERY.

Witnesses:
C. W. BLACKWELL,
WALTER H. CHAMBERLIN.